United States Patent [19]

Fujii

[11] Patent Number: 4,815,032

[45] Date of Patent: Mar. 21, 1989

[54] PORTABLE ELECTRONIC MEMORANDUM DEVICE WITH PASSWORD ACCESSIBLE MEMORY

[75] Inventor: Hiroshi Fujii, Tokyo, Japan

[73] Assignee: Casio Computer Co., Ltd., Tokyo, Japan

[21] Appl. No.: 867,244

[22] Filed: May 23, 1986

[30] Foreign Application Priority Data

May 31, 1985 [JP] Japan ................. 60-117746

[51] Int. Cl.$^4$ ............ G06F 7/28; G06F 12/14; G06F 15/40
[52] U.S. Cl. .......................................... 364/900
[58] Field of Search ............. 380/23, 24, 25; 235/380, 381, 382; 364/200 MS File, 900 MS File

[56] References Cited

U.S. PATENT DOCUMENTS

| | | | |
|---|---|---|---|
| 3,806,874 | 4/1974 | Ehrat | 340/149 R |
| 3,999,050 | 12/1976 | Pitroda | 235/132 |
| 4,005,386 | 1/1977 | Seki | 340/172.5 |
| 4,117,542 | 9/1978 | Klausner et al. | 364/900 |
| 4,139,893 | 2/1979 | Poland | 364/200 |
| 4,262,337 | 4/1981 | Jones | 364/709 |
| 4,271,482 | 6/1981 | Giraud | 364/900 |
| 4,279,022 | 7/1981 | Abe | 364/900 |
| 4,325,089 | 4/1982 | Hsu | 360/15 |
| 4,357,529 | 11/1982 | Atalla | 380/23 |
| 4,388,695 | 6/1983 | Heinemann | 364/900 |
| 4,402,056 | 8/1983 | Sado et al. | 364/705 |
| 4,442,345 | 4/1984 | Mollier et al. | 235/380 |
| 4,512,453 | 4/1985 | Schuller et al. | 364/479 |
| 4,521,853 | 6/1985 | Guttag | 364/200 |
| 4,530,068 | 7/1985 | Nakanishi et al. | 364/900 |
| 4,573,119 | 2/1986 | Westheimer | 364/200 |
| 4,736,373 | 4/1988 | Schmidt | 371/10 |
| 4,757,532 | 7/1988 | Gilham | 380/23 |

FOREIGN PATENT DOCUMENTS 0128672 12/1984 European Pat. Off. .

OTHER PUBLICATIONS

IBM Technical Disclosure Bulletin, vol. 28, No. 3, Aug. 1985, pp. 942-947, "Data Base Security/Authorization Mechanisms".

Primary Examiner—Archie E. Williams, Jr.
Assistant Examiner—Eric Coleman
Attorney, Agent, or Firm—Frishauf, Holtz, Goodman & Woodward

[57] ABSTRACT

A portable electronic memorandum device is placed in the password set mode by operating switch Sl. In this mode, if the correct password is set, the secret mode is set up and the secret data is displayed. If user forgets the password, switch Sc is operated in the error display mode. By this operation, the password and the secret data are both cleared, so that secrecy of the secret data can be protected.

18 Claims, 8 Drawing Sheets

PORTABLE ELECTRONIC MEMORANDUM DEVICE WITH PASSWORD ACCESSIBLE MEMORY

BACKGROUND OF THE INVENTION

This invention relates to a portable electronic memorandum device with a data memory which allows reading/writing of character data items such as names, telephone numbers, addresses, schedules and the like.

Recent commercially available electronic wrist watches, small electronic calculators, etc. are usually provided with time display and calculating functions. Some of these electronic devices additionally have a so-called data bank function. These devices with the data bank function have memories for storing item data such as names, telephone numbers, and schedules. Users can read out desired item data from the memories at any time. More specifically, these electronic devices usually have a secret function for protecting such data from being stolen by other persons. To this end, this device uses passwords, or secret words, without which the item data cannot be read out.

For example, U.S. Pat. No. 4,117,542 discloses two types of data bank electronic device with the so-called secret function. In the first type of the electronic device, a user presets secret codes of his own in a RAM of the device. For reading out desired data later, he enters the secret code associated with that data, which has been preset. In the second data bank electronic device, secret codes have been fixed in the ROM at the factory. The operator uses these fixed secret codes later for his desired data retrieval through appropriate keyboard operation.

However, the second type electronic device, in which secret codes have been stored in the manufacturing stage, has disadvantages. For example, if a user forgets the password, he cannot use the memory area of the device unless he can recall the password or find it out from the maker.

The first type of the electronic device, in which the user himself enters the password data into the RAM, has the following disadvantages. If the user, with a specified device model, sets the password data, for example, by key operation, it is naturally set with the procedure specified for that model. If the model device being operated by the user is one widely marketed in great numbers, the password data setting, cancellation, and change procedures for that model will be known by many people. As a result, even though the password is supposed to be secret, the cancellation and change of the password can be very easily performed by other persons, and there is danger that the secrecy will not be maintained.

SUMMARY OF THE INVENTION

Accordingly, an object of this invention is to provide a portable electronic memorandum device which enables the user to make an access to the memory even if he forgets the password for privately accessing the memory, while keeping the secrecy of the data stored.

To achieve the above object, there is provided a portable electronic memorandum device comprising:

a secret data memory section (DM) for storing secret data containing a plurality of items of character data, the memory allowing the secret data to be read out therefrom;

memory (Z) for storing password data;

input terminal (21) for password data inputting;

checker (S51 in FIG. 6C) for determining if the password is stored in the memory;

controller (S58 in FIG. 6C) for operating such that when the checker considers that no password is stored in the memory, the controller stores the password data as input from the input terminal, as password data, into the memory;

comparator (FIG. 6C) for operating such that when the checker considers that the password is stored in the memory, the comparator compares the password as input from the input terminal with the password data stored in the memory; and display (S55 to S57 in FIG. 6C, S21, and S28 to S33 in FIG. 6B) for displaying the secret data stored in the secret data memory section only when the operation result of the comparator shows the coincidence between both of the secret data.

With such an arrangement of the memorandum device, if the password data is once set, its subsequent setting is invalid. By this feature, changing of the password by other persons can be prevented.

DETAILED DESCRIPTION OF THE PREFERRED EMBODIMENTS

Figure 1:
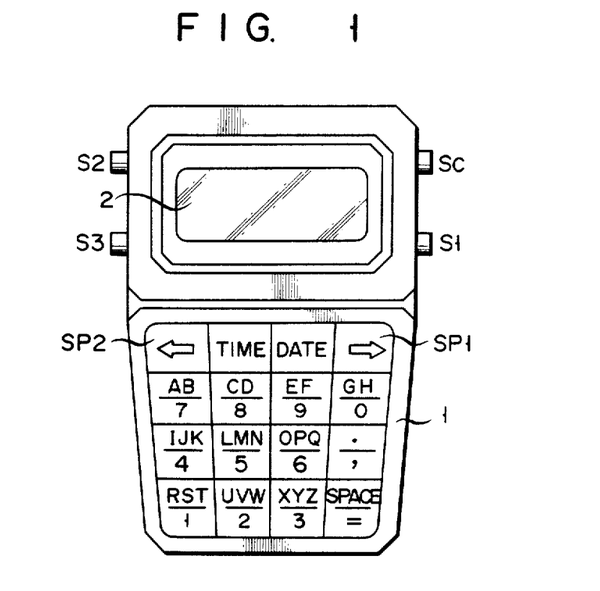
FIG. 1 shows an external view of an electronic wrist watch incorporating this invention.

Some preferred embodiments of this invention will be described referring to the accompanying drawings. In FIG. 1, there is shown an electronic wrist watch with a data bank function to which the present invention is applied. Keyboard 1 and display device 2 are located on the face of this electronic wrist watch. Display device 2 displays the time, data, etc. and also selectively displays the password data (secret code) when the password data (secret code) is set or key operation is made. Further, pages of data composed of person's names and their telephone numbers are displayed successively.

Keyboard 1 has page feed keys SP1 and SP2 besides every kind of alphabetic and numeric operational keys. In a data bank mode to be given later, these keys cause the display device 2 to change the displayed contents page by page. Key SP1 causes the display device to display the next page, while page SP2 causes it to display the preceding page. Switches S1 to S3, and Sc are provided on the sides of the watch case. Switch S3 is a mode select switch for selecting either the data bank mode or a watch mode. Switch S2 selects either a write mode or a read mode when the electronic device is in the data bank mode. In this instance, the item data such as people's names and addresses consists of secret data which cannot be displayed without entering the password data, and normal data which can be displayed at will. Switch S1 is a double-function key. In a readout (display) mode for data bank, it switches the mode between the normal mode for reading out normal data and the secret mode for reading out secret data. In the write mode for data bank, it serves as a correction digit select key. Switch Sc is a clear key for clearing the secret data.

Figure 2:
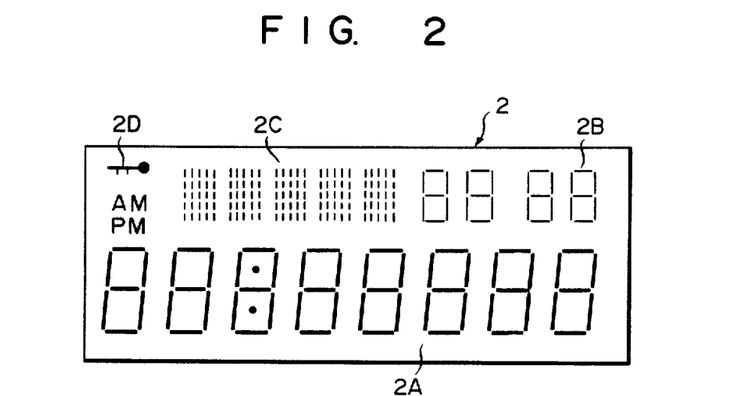
FIG. 2 shows a front view of a display section of the wrist watch, which illustrates a layout of display figures.

FIG. 2 shows a layout of display figures on the display device 2. These display figures are made of liquid crystal. A main digital display section 2A including eight digits of numeral 8 shaped figures is located in the lower part of the display device 2. Laid out in the upper part are a sub digital display section 2B made up of four digits of numeral 8 shaped figures, a matrix display section 2C of five digits, AM and PM indicators, and a secret mode mark indicator 2D. These sections and indicators are laid out in this order from right to left as viewed in the drawing.

A circuit configuration of the wrist watch will be given referring to FIG. 3. This watch is designed on the basis of the microprogram control system by 8-bit parallel processing. ROM 11 stores a microprogram for controlling all the operations of the wrist watch, and provides microinstructions OP, DO and DA in a parallel fashion. Microinstruction OP is transferred to instruction decoder 12. The decoder decodes this instruction to transfer it as a data read command or a write command to the input terminal R/W or RAM (random access memory) 13, and as an operation command to the input terminal S of arithmetic/logic unit (ALU) 14. Microinstruction DO is input as address data to the input terminal Adder of RAM 13, and as numerical data to the input terminal of DI2 of arithmetic/logic unit 14. Further, it is input to address control unit 15. Microinstruction DA is the next address data to be input to address control unit 15, whose output is input to the input terminal Adder of ROM 11.

RAM 13 includes registers for temporarily storing data and for operating data, and is used for clock, key-in and operation processings, and the like. It is operated under control of instruction decoder 12. The data read out DO from RAM 13 is applied to the input terminal DI1 and DI2 of ALU 14, and is displayed by display unit 17 under control of display control unit 16. In response to operation commands from instruction decoder 12, ALU 14 executes various types of operations. Data representing a result of operation is applied to the input terminal DI of RAM 13, and loaded into the memory. When the judge operation is executed, ALU 14 outputs a signal representative of presence or absence of the operation result data and of carrier, and applies it to address control unit 15. Finally, it changes the address in ROM 11. Address control unit 15 is applied with a clock signal at 16 Hz, which is formed by appropriately frequency dividing the reference clock signal from oscillator 18 by frequency divider 19. According to this 16 Hz signal, the clock processing is executed with the interrupt every 1/16 second. A signal at a predetermined frequency as output from frequency divider 19 is applied to timing generator 20 and causes it to produce various types of timing signals, which are applied to related circuits. Key codes output from key-in unit 21 are applied to the input terminal DI2 of ALU 14.

Figure 3:
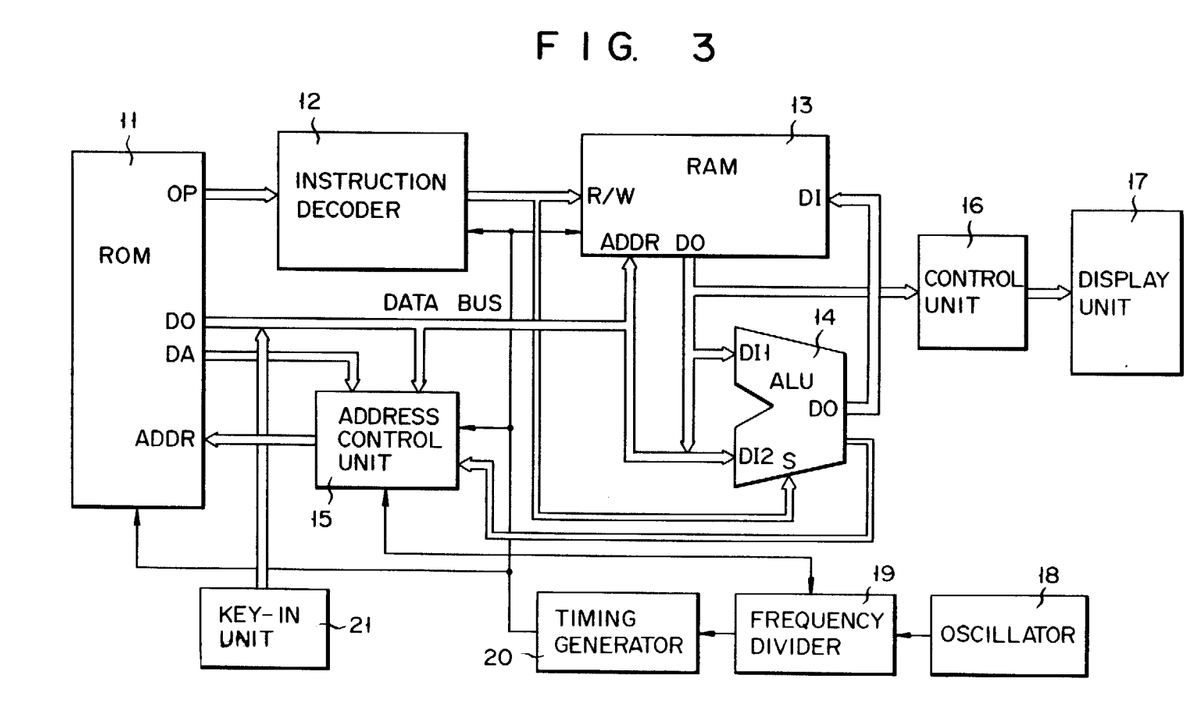
FIG. 3 shows a block diagram of the wrist watch shown in FIG. 1.

The technique, in which the clocking and other operations are executed according to a predetermined control flow, using the hardware including ROM, RAM, instruction decoder, ALU, and the like, as shown in FIG. 3, has been known, as disclosed in U.S. Pat. Nos. 4,274,146 and 4,181,963, for example.

Figure 4:
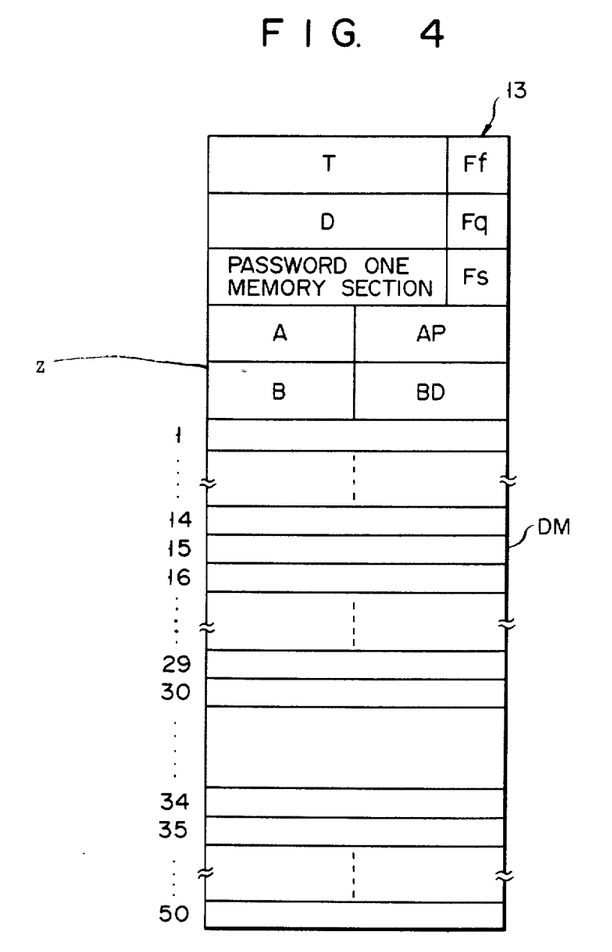
FIG. 4 shows a diagram showing a memory map of RAM 13 in the FIG. 3.

FIG. 4 shows a memory map of RAM 13. RAM 13 has a memory area for storing clock data, system control data, and item data such as names and telephone numbers, which can freely be written and read out through the key operation by the user. As shown in FIG. 4, in RAM 13, register T is for storing current time. Register D is for storing date. Password memory section Z stores preset 4-digit passwords. Data memory DM stores various types of item data for data bank such as normal data and secret data. Memory A stores all items of normal data as stored in this data memory DM. Memory B stores all items of secret data as stored in data memory DM. Normal display page pointer AP stores the displayed page number of the normal data. RAM 13 is further provided with secret display page pointer BD for storing the displayed page number of secret data, and flag registers Ff, Fq and Fs. Data memory DM can store item data up to 50 pages corresponding to the digits "1" to "50". Data memory DM consists of 50 memory addresses, whose memory areas can store a maximum of 50 pages of item data. Normal data is stored from address No. 1 in numerical sequence. Secret data is stored starting at address No. 50, in reverse numeral sequence. The number of addresses having normal and secret data as stored are not necessarily divided equally (25 and 25), but differ according to the quantity of each type of data. For example, if there are 30 pages of normal data, there is only room for 20 pages of secret data, because the maximum total number of addresses in the memory is 50. Therefore, if either normal or secret data is not stored, up to 50 pages of the other data can be stored in the memory. Thus, in this embodiment, the names and telephone numbers required by the user are listed as one set. The telephone numbers which the user does not want other people to know are classified as secret data, and the remaining numbers as normal data.

Then, the names are compiled in alphabetical order and stored into the memory.

Figure 5:
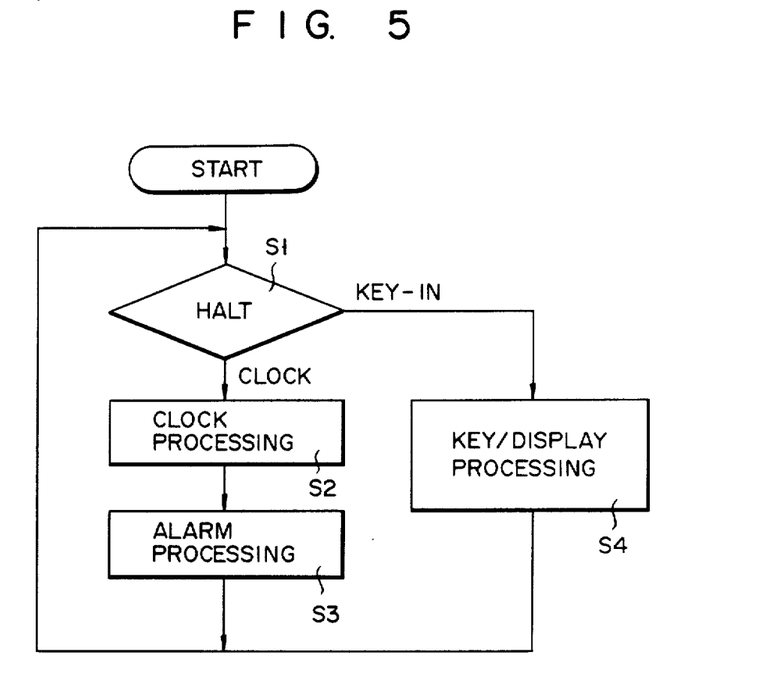
FIG. 5 shows a general flowchart of the circuit shown in FIG. 3.
Figure 6A:
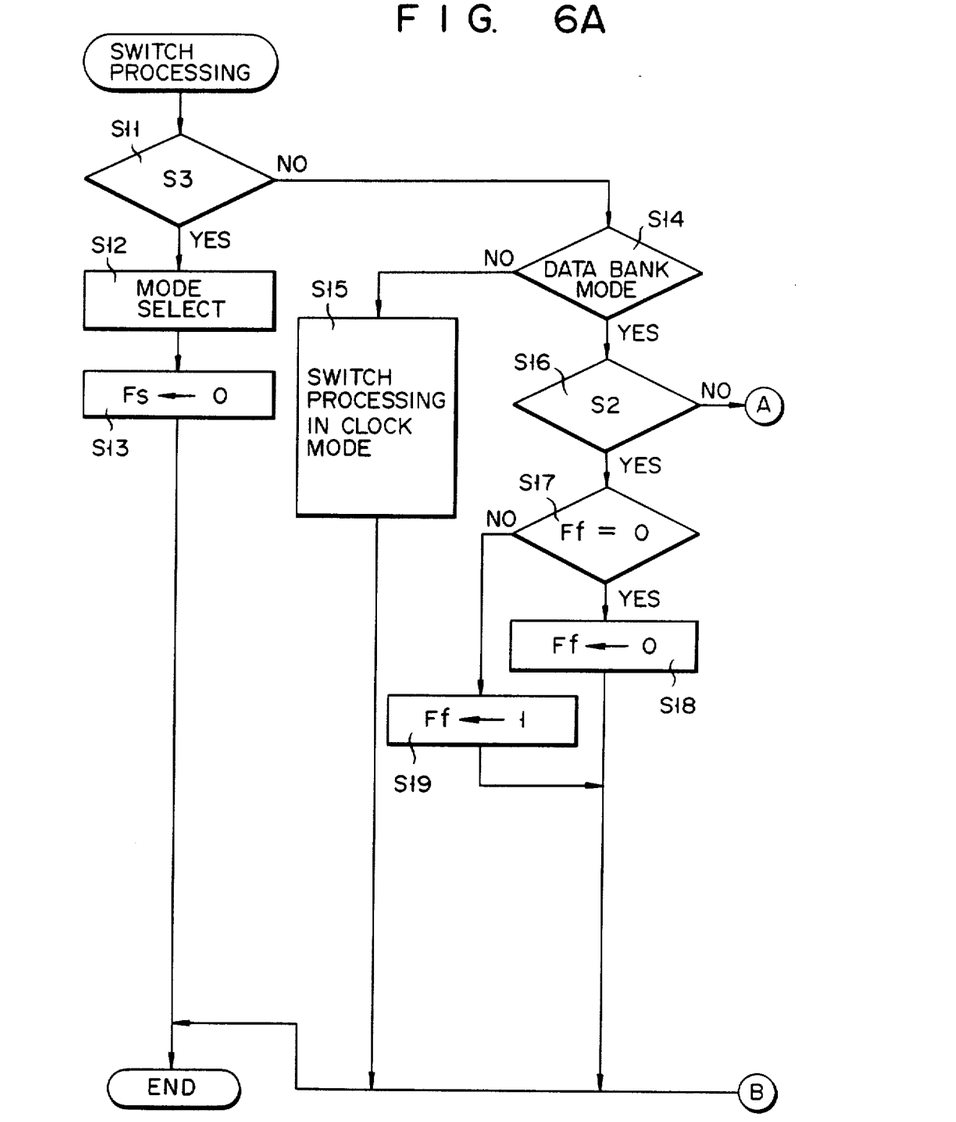
FIGS. 6A to 6C show flow charts illustrating in detail step S4 of the general flowchart shown in FIG. 5.
Figure 6B:
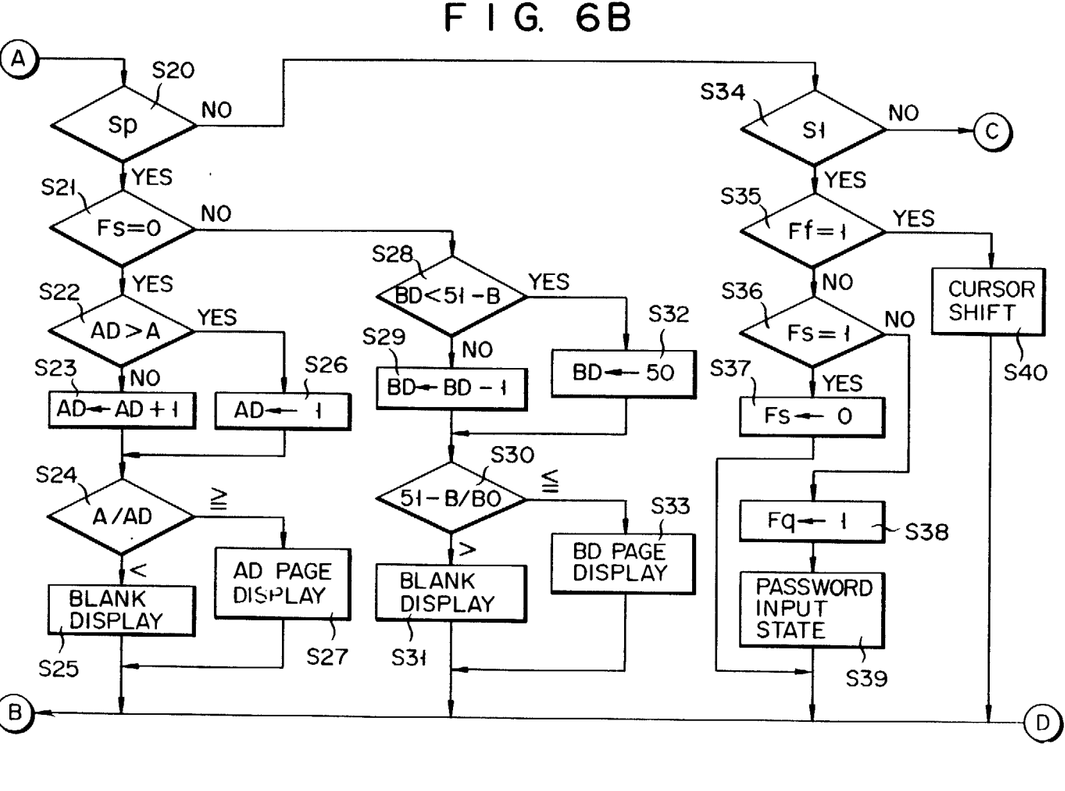
Figure 6C:
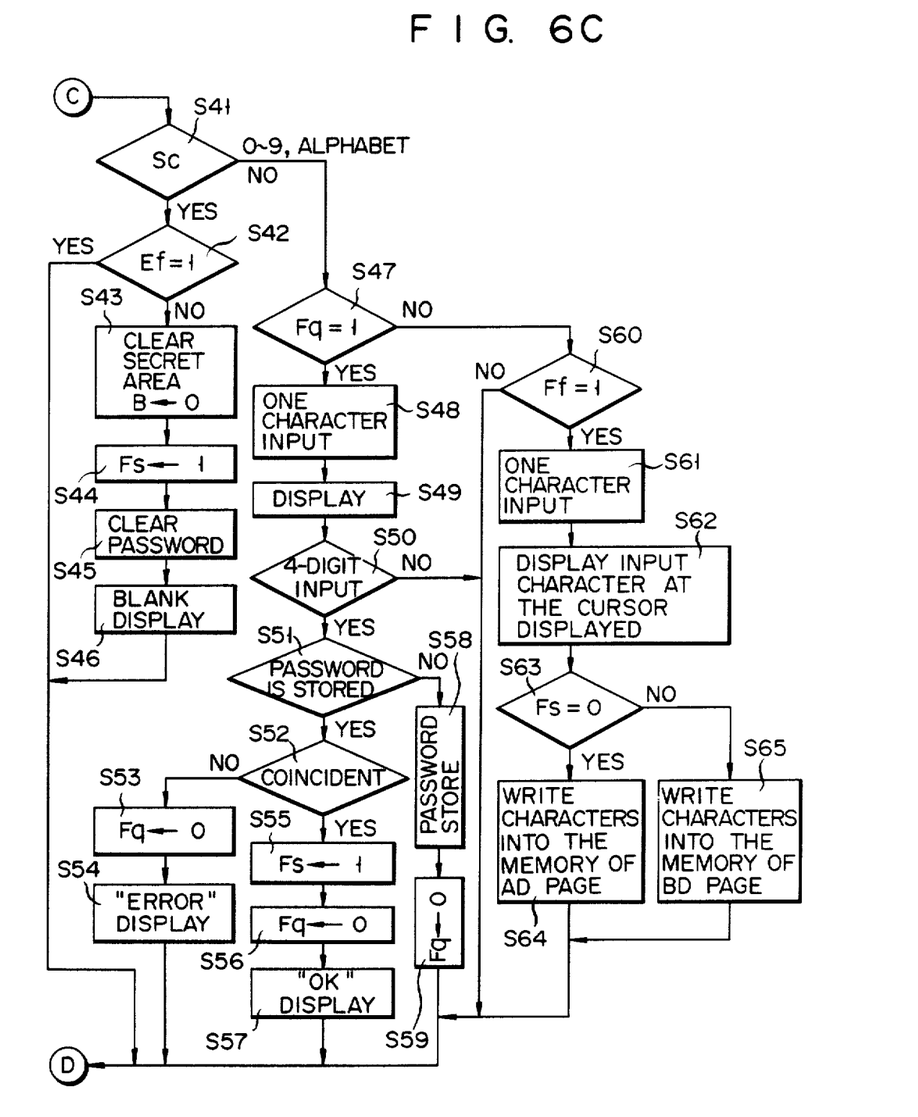
Figure 7:
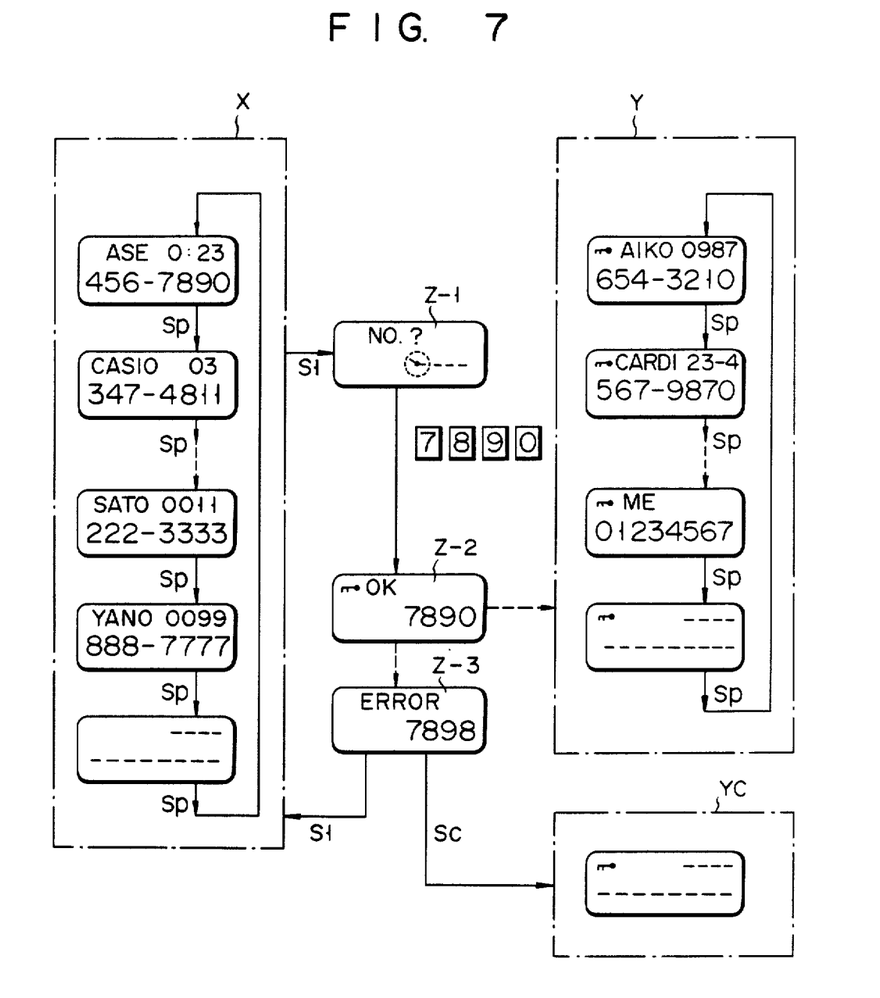
FIG. 7 shows a diagram illustrating a sequence of changing displays when the switching operation is performed in the wrist watch shown in FIG. 1.

The operation of the electronic memorandum device according to this invention will be described referring to FIGS. 5 to 7. FIGS. 5, and 6A to 6C show flowcharts describing the operations. FIG. 7 illustrates the states of displays which are changed by the operation switches.

An outline of the overall operation of the device will be given with reference to the general flowchart of FIG. 5. In step S1, the memorandum device remains in a standby state until it is required by watch timing or key-in. When a clock signal of 16 Hz is output from frequency divider 19, the control by CPU proceeds to step S2, and clock processing is executed. After this, the alarm processing of step S3 is executed. When a key code corresponding to the operated key is output from key-in unit 21, a key processing program as specified by this key code is specified, and key processing and display processing are executed by step S4. FIGS. 6A through 6C show flowcharts illustrating in detail the key processing and display processing of step S4 of FIG. 5. When the mode is changed from clock mode to data bank mode or vice versa by operating switch S3, this change is detected in step S11. After the mode change processing is executed in step S12, register Fs is cleared in step S13. Register Fs stores a flag indicating the secret mode or the normal mode. When the contents of Fs are "1", the secret mode is specified, and when it is "0", the normal mode is specified. Accordingly, after a mode change is accomplished by operation of the switch S3, register Fs is automatically placed in the "0" or normal mode. In the clock mode, when switches other than switch S3 have been operated, the control flows from step S11 through step S14 for mode check and proceeds to step S15. In this step S15, the processing as specified by the operated key in the clock mode, such as correction processing and alarm time setting processing is performed.

When the mode is set to the data bank mode, this condition is detected in step S14, and the control proceeds to step S16. Step S16 checks (judges) if switch S2 has been operated or not. Switch S2 is used to select either the read out mode or write mode in the data bank mode. If step S16 confirms that switch S2 has been operated, step S17 checks, according to the contents of register Ff, if the present mode is the read out mode or the write mode. If the contents of register Ff are "1", the write mode is valid, and if they are "0", the read out mode is valid. If the write mode is specified, register Ff is cleared in step S18, and the read out mode is set up. If the read out mode is set up, the control of step S19 sets "1" to register Ff to set up the write mode.

During such a mode select processing, when the read out mode for the data bank is set up, vis. "0" is set in register Ff, if page feed key S is operated, the operation of key SP is checked and the control advances to step S21. In this step, according to the contents of register Fs, the mode of the device is checked if it is normal or secret, the normal data is cyclically read out page by page from data memory DM of RAM 13 every time switch SP1 is operated, and displayed. This is because the device has been set in the normal mode in step S13. In this step, the display page of the normal data stored in normal display page pointer Ad is compared with all items of normal data as stored in memory A. If the former is smaller than the latter, the control of the next step S23 increments by one of the display page number of normal display number pointer AD. As a result, if the display page number is smaller than all the items of data, the normal data is still stored in the data memory DM. This is detected by step S24, and then the control goes to step S27. In this step, the normal data corresponding to the display page number is read out and displayed. As the result of the increment processing, if the display page number exceeds the all-items data, viz. switch SP is operated when the final normal data is being displayed, step S25 is executed and the blank display is made to indicate blank page. Under this condition, if switch SP1 is further operated, the control goes from step S22 to step S26. In this step, "1" is set to normal display page pointer AD. The first normal data is read out and displayed.

In FIG. 7, the block X enclosed by the broken line in FIG. 7 indicates the displays in the normal data read out mode. In this display, every time switch SP1 is operated, the normal data is successively read out from data memory DM in the direction of address "1" to "50", and is displayed successively. When the final normal data is displayed, the next switch operation of switch SP1 causes the blank display. The additional switch operation of switch SP1 causes the display to display the first normal data. In this way, the normal data is cyclically displayed.

In the secret data read out mode in which the contents of register Fs are "1", if switch SP1 is operated, the processings (S28 to S33) corresponding to the above steps S22 to S27 are executed. At this time, the secret data has been stored in data memory DM in the order from address "50" to "1". Therefore, in steps S28 and S30, the value obtained by subtracting the number of secret data from the contents at address "51" is compared with the display page number of the secret data. In step S29, the secret data is read out in the direction from the address "50" to address "21" of data memory DM. Accordingly, the contents of secret display page pointer BD are decremented by one every time switch SP1 is operated. In step S32, to cyclically display normal data, the contents at address "50" are set in secret display page pointer BD. The block Y enclosed by broken line in FIG. 7 shows the displays in the secret data read out mode. Every time switch SP1 is operated, the secret data is successively read out in the order from address "50" to address "1" of data memory DM, and is displayed in successive manner.

When the final secret data is displayed, the blank display is made by operation of switch SP1. A further operation of switch SP1 causes the display to display the first secret data.

In this way, to change the normal data read out mode to the secret data read out mode, switch S1 is operated and then a password is input. When switch S1 is operated, this switch operation is detected in step S34 and the control advances to step S35. In the step, check is made if the mode set up is write mode or read out mode for data bank. The next step S36 further checks if the mode is the normal mode or the secret mode. Since the present mode is in the normal data read out mode, the control proceeds to step S38. This step sets "1" in register Fq. This register is for storing a flag showing permission or prohibition of inputting the password. "1" of the flag specifies password input permission, while "0" of the flag specifies the password input prohibition. Thus, in the normal data read out mode, if switch S1 is operated, the password input permission is set up. At the same time, in step S39, the display for password input permission is performed. the block z-1 in FIG. 7 shows the display at this time. This display contains the display (No ?) to specify the inputting of the password, and the display of cursor "—" corresponding to each digit for showing input digits (4 digits) as well. At the initial stage of the display, the display for the first digit flickers at 1 Hz. After checking the initial display for password input, the ten keys are operated for inputting the password of four digits. The control advances from step S41 to step S47. Step S41 checks if clear switch Sc is cleared. At this time, if switch Sc is not operated, CPU considers that ten keys or alphabet keys are operated, and executes step S47. This step checks if the password input is permitted on the basis of the contents of register Fq. At present, switch S1 is operated in the normal data read out mode, and hence the password is placed in the input permission state. Therefore, the control goes to step S48 where one character input processing is performed. The first data as input in step S48 is displayed as the first digit data of the password in step S49. In the step S50, check is made whether or not all digits of the password (four digits in this instance) have been input. Since the first digit is input in the first place, the sequence of processings from step S41 to S44 are repeated until all of the digits have been input. Upon completion of the password inputting, step S51 checks if the password is stored (registered) in the password memory Z in RAM 13. If it is registered, step S52 compares the password stored in password memory Z with the input password to check if these are coincident with each other. If these are not coincident with each other, register Fq is cleared in the next step S53 and the password input prohibition state is set up. In the next step S54, "ERROR" is displayed, as shown in the block Z-3 in FIG. 7. If the register password and the input password are coincident with each other, "1" is set in register Fs in step S55 to change the mode from the normal mode to the secret mode. Thus, the secret mode, in the normal mode, is automatically changed through the procedure that following the operation of switch S1, the password is input, and CPU considers that it is correct. In the next step S56, register Fq is cleared, and the password prohibition state is set up. In the next step S57, OK is displayed, as shown by the block Z-2 in FIG. 7. In step S51, if CPU confirms that the password is not yet registered, the 4-digit numerical data as input in step S58 is sent to and stored in password memory Z of RAM 13. Further, in step S59, register Fq is cleared.

Thus, when the correct password is input, register Fs contains "1" and the mode is automatically changed to the secret mode. Further, when switch SP1 is operated, the control advances from step S21 to step S28, allowing the secret data to be read out. If the output error of the password is detected, no mode change to the secret mode occurs, so that the secret data can be read out.

As seen from this feature, the secret data stored in the secret area of RAM can not be read out by other persons than the person who knows the password. In other words, only the owner of the wrist watch who sets the password can read out the secret data for display, thereby to keep the secrecy of his private data.

If the owner forgets his password, it is only needed that he clears only the secret data in the secret area of RAM, and sets new secret data and password associated with it. Specifically, by operating clear switch Sc, the control advances from step S41 to S42 where check is made if the mode is the write mode or read mode, on the basis of the contents of register Ff. Since the present mode of the electronic memorandum device is the read out mode, the control goes to step S43. In this step, the memory B in RAM 13 is cleared, so that all items of secret data are all "0's". Subsequently, in step S44, "1" is set in register Fs. In the next step S45, the password memory Z of RAM 13 is cleared. In step S46, the blank display is performed. The block YC in FIG. 7 shows the display at this time. As recalled, the mode is changed to the secret mode by the operation of clear switch Sc. At this time, all items of the secret data are cleared. Under this condition, if page change key SP1 is operated, the display is left in the blank display. If page feed key SP1 is operated when memory B is cleared, the control starts at step S20, proceeds through steps S21 and S28 to step S32. The display page number of secret data is necessary "50". The control proceeds from step S30 to step S31, to keep the blank display. Thus, when clear switch Sc is operated, the read out of the secret data is prohibited and the secret data area of data memory DM is cleared.

Under such a clear state in the secret mode, if switch S1 is operated, the control proceeds to step S37 through steps S35 to S36. In this step, register Fs is cleared to set up the normal mode. In this case, steps S38 and S39 are not executed. By operating page feed key SP1 after the normal mode is changed, the normal data can be cyclically read out and displayed through the execution of steps S22 and S27. As seen from above, even if clear switch Sc is operated, only the secret data is cleared, while keeping the normal data in its state. Therefore, it is possible to read out the normal data at will.

The data write operation of the electronic memorandum device will be described. As a first step, in the data bank mode, by operating switch S2, "1" is set to register Ff to set up the write mode. In this write mode, ten keys are operated to enter telephone numbers, and alphabet keys are operated to enter names. Then, the control advances from step S41 to step 47. At this time, register Fq is still in the password inhibition state. Therefore, the control proceeds to step S60. In this step, check is made if the mode is the read out mode or the write mode on the basis of the contents of register Ff.

Since the memorandum device is now in the write mode, the character entering is executed in the next step S61. Then, in step S62, the characters entered are each displayed at the digit position corresponding to the displayed cursor position. Check is made if the mode is the normal mode or the secret mode on the basis of the contents of register Fs. If it is the normal mode, the control goes to step S64. In this step, the entered characters are stored into the data memory DM area, which corresponds to the normal display page of the normal display pointer. If it is the secret mode, the next step S65 is executed to enter input characters into the memory area of data memory DM, which corresponds to the secret display page of secret display page pointer BD. In this way, the data of one page is performed. Upon completion of this writing operation, page feed key SP1 is operated to alter the contents of normal display page pointer AD or secret display page pointer BD. Further, ten keys and alphabet keys are operated to enter the data of one page. In this way, both of the normal data and secret data can be written into the memory.

In the write mode, if switch S1 is operated, the control advances through steps S34 and S35 to step S40. The cursor displayed is shifted by one digit. Even if clear switch Sc is operated, its operation is invalid in this write mode.

As described above, in this embodiment, in case that the user forgets his password, by operating clear switch Sc, only the secret data is cleared, while the normal data is left as it is, allowing it to be read out. In such a case, accordingly, it is merely required to write only the secret data into the memory. In this respect, the data writing operation is simple.

In the above-mentioned embodiment, the contents of memory B for storing all items of secret data are cleared. Alternatively, "0 0 . . . " is written into the memory area for secret data, and then is cleared. Although in the aforementioned embodiment the secret data has been explained as being optically displayed on liquid crystal display device 2, it may be printed out by, for example, a printer.

This invention can be applied not only to an electronic timepiece as set forth above, but also to any proper device, such as a disk time-keeper, compact type electronic calculator, and IC card. It should be understood that the present invention is not limited to the above-mentioned embodiments, but may variously be changed and modified within the scope of this invention.

What is claimed is:

1. An electronic type memorandum device comprising:
   secret data memory means for storing secret data containing a plurality of character data items;
   password data memory means for storing data as password data that enables secret data to be stored in said secret data memory means;

means for inputting data;

judging means, operated upon entry of data by the inputting means, for judging whether or not corresponding data is present in said password data memory means;

password data memory control means which, when the judging means judges an absence of data in said password data memory means, allows that data which is input by said inputting means to be stored as password data in said password data memory means;

comparing means which, when said judging means judges that password data has been stored in said password data memory means, compares the contents of the data input by said inputting means with the contents of the password data stored in said password data memory means; and display means for displaying secret data stored in said secret data memory means only when the result of a comparison by said comparing means shows a coincidence between the contents of the data input by said inputting means and the contents of said password data in said password data memory means.

2. An electronic type memorandum device according to claim 1, in which said judging means includes check means for checking whether or not numerical data is present in said password data memory means.

3. An electronic type memorandum device according to claim 1, comprising switch means for changing between a write mode allowing the data entry of said data inputting means and a mode prohibiting said data entry, and wherein said judging means, password data memory control means, comparing means and display means operate when the write mode is set by said switch means.

4. An electronic type memorandum device according to claim 1, in which said secret data contains persons' names and telephone numbers.

5. An electronic type memorandum device according to claim 1, in which the operations of said judging means, said password data memory control means, said comparing means and said display means are under control of a microprogram as stored in a read only memory.

6. An electronic type memorandum device according to claim 1, comprising clock means for counting current time, and clock display means for displaying the current time as counted by said clock means.

7. An electronic type memorandum device according to claim 1, in which said display means comprises printing means which prints the secret data in said secret data memory means.

8. An electronic type memorandum device, comprising:

secret data memory means for storing secret data;

data input means for inputting data;

password data memory means for storing data as password data;

judging means, operated upon entry of data by the inputting means, for judging whether or not corresponding data is present in said password data memory means;

password data memory control means which, when the judging means judges an absence of data in said password data memory means, allows that data which is input by said inputting means to be stored as password data in said password data memory means and prohibits new password data from being input when data is currently stored in said password data memory means until the currently stored data is cleared;

display means for displaying secret data stored in said secret data memory means only when said display means receives data corresponding to the password data stored in said password data memory means;

password data clearing means for clearing the password data stored in said password data memory means; and secret data clearing means for clearing the secret data stored in said secret data memory means when said password data is cleared by said password data clearing means.

9. An electronic type memorandum device according to claim 8, comprising switch means for effecting switching between a write mode allowing the entry of password data and a mode prohibiting the entry of password data, and wherein said password data memory means allows the password data to be input when the write mode is effected by said switch means.

10. An electronic memorandum device according to claim 8, in which said secret data includes persons' names and telephone numbers.

11. An electronic type memorandum device according to claim 8, in which the operations of said password data clearing means and said secret data clearing means are under control of a microprogram as stored in a read only memory.

12. An electronic type memorandum device according to claim 8, comprising clock means for counting current time, and clock display means for displaying the current time as counted by said clock means.

13. An electronic type memorandum device according to claim 8, in which said display means comprises a display device for displaying the secret data stored in said secret dat memory means, and comparing means for comparing the data input by said data input means and the password data stored in said password data memory means.

14. An electronic type memorandum device according to claim 13, in which said display device comprises printing means for printing the secret data.

15. An electronic type memorandum device, comprising:

a data memory section having memory areas for storing (a) secret data to be read out by entering password data, and (b) normal data to be read out without entering said password data, said secret data and said normal data being stored in different memory areas of said data memory section;

password data memory means for storing data as password data;

display means for reading out the secret data and the normal data, as stored in said data memory section;

data input means for inputting data;

judging means, operated upon entry of data by the inputting means, for judging whether or not corresponding data is present in said password data memory means;

password data memory control means which, when the judging means judges an absence of data in said password data memory means, allows that data which is input by said inputting means to be stored as password data in said password data memory means and prohibits new password data from being input when data is currently stored in said password data memory means;

comparing means which, when said judging means judges that password data has been stored in said password data memory means, compares the contents of the data input by said inputting means with the contents of the password data stored in said password data memory means;

password data clearing means for clearing the password data stored in said password data memory means; and secret data clearing means for clearing only the secret data among the secret data and the normal data stored in said data memory section, when said password data is cleared by said password data clearing means.

16. An electronic type memorandum device according to claim 15, comprising area data memory means for storing a memory area that stores said secret data, said secret data clearing mens performing a clearing operation on the basis of the memory area stored in said area data memory means.

17. An electronic type memorandum device according to claim 15, in which said data memory section is a random access memory operated when it is accessed.

18. An electronic type memorandum device according to claim 15, further comprising clock means for counting current time, and clock display means for displaying the current time as a counted by said clock means.

* * * * *